United States Patent [19]
Wanamaker

[11] Patent Number: 5,971,623
[45] Date of Patent: Oct. 26, 1999

[54] FIBER OPTIC TRUNKLINE FOR AN AIRCRAFT WITH BREAKOUT BOXES THEREALONG

[75] Inventor: Michael F. Wanamaker, Garden Grove, Calif.

[73] Assignee: McDonnell Douglas Corporation, Huntington Beach, Calif.

[21] Appl. No.: 08/950,812

[22] Filed: Oct. 30, 1997

Related U.S. Application Data

[63] Continuation of application No. 08/641,324, Apr. 29, 1996, abandoned.

[51] Int. Cl.$^6$ ............................................. G02B 6/36
[52] U.S. Cl. ........................ 385/53; 385/59; 385/76; 385/135; 385/139
[58] Field of Search ........................ 385/53, 56, 59, 385/71, 76, 95, 135, 139, 147

[56] References Cited

U.S. PATENT DOCUMENTS

| | | | |
|---|---|---|---|
| 3,706,134 | 12/1972 | Sweeney et al. | 29/629 |
| 3,902,786 | 9/1975 | Brown | 350/96 C |
| 4,140,366 | 2/1979 | Makuch et al. | |
| 4,171,867 | 10/1979 | Cocito | 385/135 |
| 4,359,262 | 11/1982 | Dolan | 385/135 |
| 4,648,168 | 3/1987 | Nolf et al. | 29/447 |
| 4,744,629 | 5/1988 | Bertoglio et al. | |
| 4,859,020 | 8/1989 | Deusser et al. | 350/96.2 |
| 5,109,467 | 4/1992 | Hogan et al. | 385/135 |
| 5,127,082 | 6/1992 | Below et al. | 385/135 |
| 5,267,338 | 11/1993 | Bullock et al. | 385/100 |
| 5,394,502 | 2/1995 | Caron | 385/134 |
| 5,394,503 | 2/1995 | Dietz, Jr. et al. | 385/135 |
| 5,432,875 | 7/1995 | Korkowski et al. | 385/27 |

FOREIGN PATENT DOCUMENTS

| | | |
|---|---|---|
| 0408266 | 7/1990 | European Pat. Off. |
| 60-169813 | 3/1985 | Japan |
| 63-136007 | 8/1988 | Japan |
| 02278206 | 4/1989 | Japan |

OTHER PUBLICATIONS

Shinji Nagasawa, *Design and Performance of Small–Size Optical Fiber Fanout Connector for Fiber–Ribbon Cable Termination*, The Transactions of the IEICE, vol. E 72, No. 11 (Nov. 1989).

*Primary Examiner*—Phan T. H. Palmer
*Attorney, Agent, or Firm*—Alston & Bird LLP

[57] ABSTRACT

A system and method to breakout and splice into optical circuits in a ribbon cable trunkline extending throughout an aircraft with optical minimal loss. Breakout boxes are positioned at strategic locations along the aircraft's fiber optic trunkline. Within each box, optical fibers in a loose bundle are permanently connected in ribbon cable form to the inner sides of cable connector physically connected to the box, each extending through a wall of the box. The ribbon cable forms are transitioned into the fibers in the bundle, which are longer than the spacing between the cable connectors. When an optical fiber circuit needs to be broken out at the location of a particular box, the proper fiber in the bundle is cut and one or both ends that result are permanently connected to a breakout connector, also positioned through the box, so that the optical circuit appears on the breakout connector outside the box where a mating connector can be used to further route the optical circuit being broken out.

12 Claims, 1 Drawing Sheet

FIBER OPTIC TRUNKLINE FOR AN AIRCRAFT WITH BREAKOUT BOXES THEREALONG

This application is a continuation of copending application Ser. No. 08/641,324, filed Apr. 29, 1996 now abandoned.

BACKGROUND OF THE INVENTION

During the development, production and modification of aircraft, it is often required that additional connections must be made to the communication busses that extend throughout the aircraft. When an electrical buss is used, techniques to splice into or reroute the wire of a communication channel of the buss are well developed. Aircraft are now being designed using a fiber optic trunkline usually formed using multi-fiber optical ribbon cable. Unfortunately, after the ribbon cable has been constructed, splicing into or breaking out a fiber from the middle thereof is difficult and labor intensive.

Various solutions that allow after manufacture changes to the configuration of fiber optic cables are shown in the prior art. For example, Brown in U.S. Pat. No. 3,902,786 discloses an optical access coupler. Nolf, et al. in U.S. Pat. No. 4,648,168 disclose a technique for protecting an optical fiber breakout one fiber at a time. Hogan, et al. in U.S. Pat. No. 5,109,467 disclose a cabinet in which optical fibers can be interconnected. Below, et al. in U.S. Pat. No. 5,127,082 disclose a fiber optic patch panel. Bullock, et al. in U.S. Pat. No. 5,267,338 show a low profile cable having component breakouts there along. Caron in U.S. Pat. No. 5,394,502 shows a harness to support breakouts in a fiber optic cable. Dietz, Jr., et al. in U.S. Pat. No. 5,394,503 disclose an optical patch panel wherein the connection between optical fibers can be switched. Korkowski, et al. in U.S. Pat. No. 5,432,875 show a fiber optic connector module, which has beam splitters incorporated therein.

Renichi Wuguchi, et al. in Japanese application 61-283669 published Oct. 20, 1988 disclose a fiber optic breakout box with a pair of optical line connectors and a breakout connector mounted thereto for connection to external optical cables. Optical patch cords having connectors on the opposite ends thereof, are used inside the box to make or break connections between the line connectors and the breakout connector to establish the desired optical circuits and to allow the connections to be modified in the field.

BRIEF DESCRIPTION OF THE INVENTION

The present invention provides the ability to breakout and splice into optical circuits in a trunkline extending throughout an aircraft with minimal loss. Breakout boxes are positioned at strategic locations along the aircraft's fiber optic trunkline located along the longitudinal axis of an aircraft. The trunkline is usually constructed using a plurality of multi-fiber ribbon cable segments. Conventional ribbon cable connectors, such as those known as AVMAC to which Berg Electronics owns the rights, are attached to each end of a ribbon cable segment. Mating fixed AVMAC connectors extend through opposite sides of each breakout box. Within the box, fibers in a loose bundle are permanently connected to the inner sides of the fixed ribbon cable connectors. The permanent connection minimizes optical loss and increases the reliability of the trunkline. The bundle preferably is longer than the spacing between the fixed connectors and is formed in a loop. One or more breakout connectors are provided through the box. When an optical fiber circuit needs to be broken out at the location of a particular box, the proper fiber in the bundle is cut and one or both ends that result are permanently connected to a breakout connector so that the optical circuit appears on the connector outside the box where a mating connector can be used to further route the optical circuit. The loop provides enough slack so that either end of the cut fiber can be terminated and reach any breakout connector. The interior side of the breakout connector may be of any suitable configuration that allows manual permanent fiber connection thereto. The exterior of the breakout connector, however, preferably is of a standard fiber optic cable configuration allowing the circuits that are broken out to be easily connected to various optical components.

Therefore, the present aircraft trunkline with breakout boxes allows optical circuits to be permanently rerouted within the confines of an aircraft with minimal optical power loss. Little optical penalty results because normally the routing of optical cable within an aircraft requires numerous cable segments anyhow that need to be connected together to accommodate installation and repair, and the boxes can be positioned to also fill that purpose.

Therefore, it is an object of the present invention to provide economical means that allow breakouts from optical ribbon cables used as multi-channel optical trunklines in aircraft.

Another object is to provide an aircraft optical cable breakout box in an aircraft optical trunkline which minimizes the optical loss therein, especially for circuits where no breakout is needed.

Another object is to provide an optical cable breakout box having low optical loss so that a multiplicity of the boxes may be positioned along an optical trunkline in an aircraft without requiring excessive power or amplifiers there along.

These and other objects and advantages of the present invention will become apparent to those skilled in the art after considering the following detailed specification, together with accompanying drawing wherein:

DETAILED DESCRIPTION OF THE SHOWN EMBODIMENT

Figure 1:
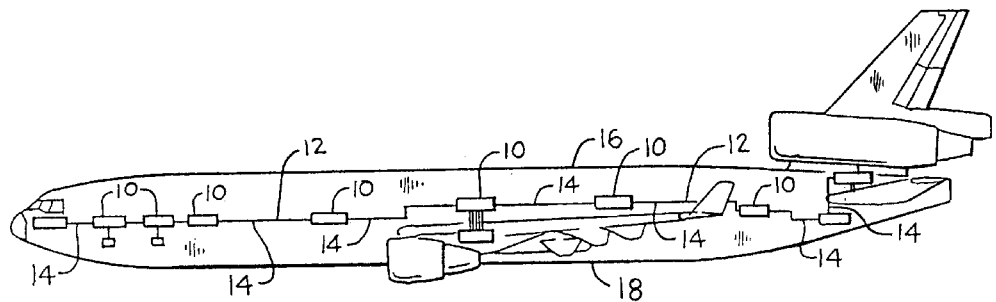
FIG. 1 is a diagrammatic side elevational view of an aircraft having an optical trunkline with breakout boxes constructed according to the present invention strategically positioned there along.

Referring to the drawing more particularly by reference numbers, number 10 in FIG. 1 refers to breakout boxes positioned along an optical trunk line 12 made up of a plurality of ribbon cables segments 14, which extend longitudinally along the fuselage 16 of an aircraft 18.

Figure 2:
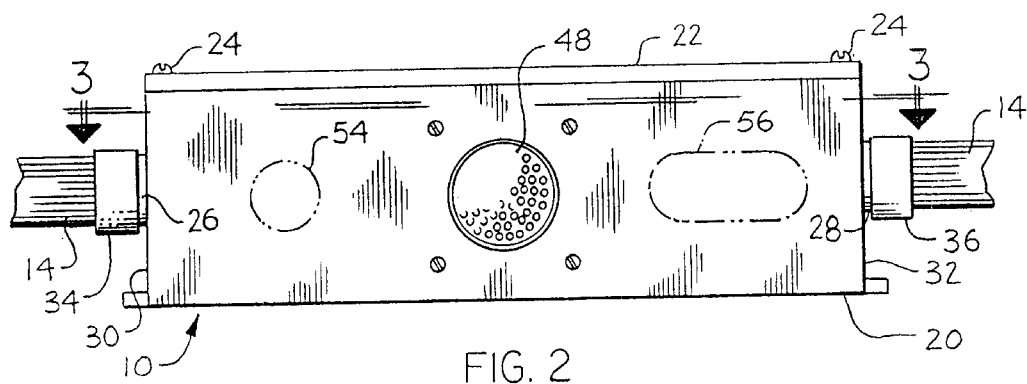
FIG. 2 is a side view of the breakout box of the present invention with ribbon cable connected at both sides thereof.
Figure 3:
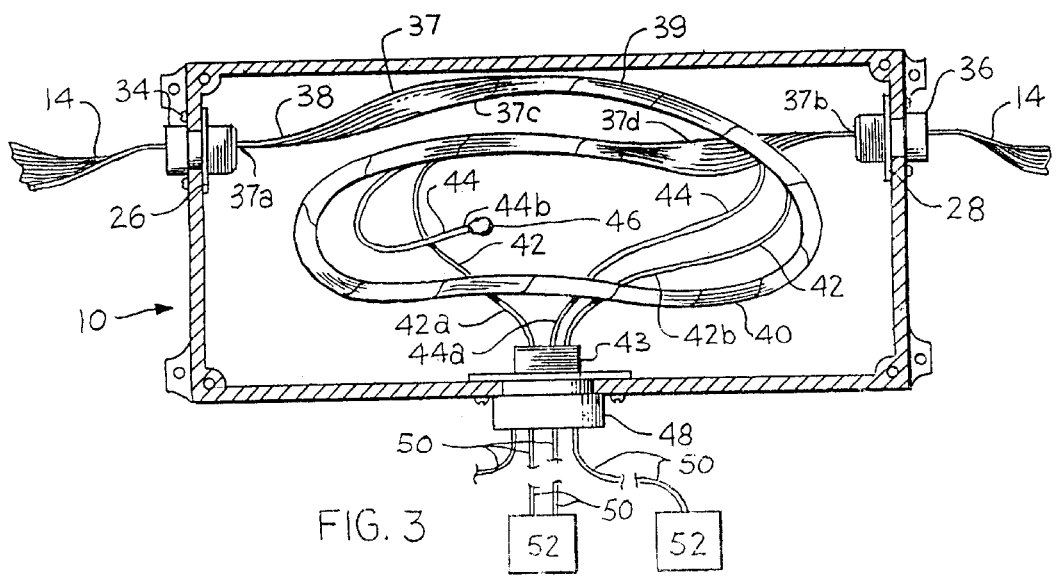
FIG. 3 is a cross-sectional view taken at line 3—3 of FIG. 2 showing how typical breakouts and splices are accomplished.

As shown in FIGS. 2 and 3, the box 10 includes a container 20 closed by a cover 22 held in place by suitable fasteners 24. An input/output port connector 26 and an output/input port connector 28 are provided at the opposite ends 30 and 32 of the container 20. The optical connectors 26 and 28 are designed to mate with optical plugs 34 and 36 attached to the ends of the ribbon cable segments 14. The optical loss between the connectors 26 and 28, and the plugs 34 and 36 can be very low. The optical connectors 26 and 28 are connected by a pre-made breakout cable 37 that includes a plurality of individual optical fibers 38. The ends 37a and 37b of the breakout cable are in the form of ribbon cable for connection to the fibers in the optical plugs 34 and 36, whereas breakout portions 37c and 37d where the plurality of fibers 38 are broken out, sheathed, and formed into a central loose bundle 39. The loose bundle 39 has enough extra length so that a loop 40 can be formed within the box 10 between the connectors 26 and 28. The loop 40 provides enough slack in each of the fibers of the central bundle 39 so that as shown in FIG. 3, a fiber 42 can be cut at its middle, terminated, and both ends 42a and 42b be permanently connected to a suitable branch port (breakout) connector 43 by manual means when the cover 22 of the container 20 has been removed. Normally, this would be accomplished by disconnecting the connectors 26 and 28 from the optical plugs 34 and 36, removing the box 10 from the aircraft 18 for the modification work, and reinstalling the box 10 in the aircraft 18. A fiber 44 also can be cut and only one end 44a of two ends 44a and 44b that result, be terminated and attached to the connector 43. If the unconnected end 44b is an extension of an active optical circuit, a light absorbing termination 46 is applied thereto. In this way, any circuit present on the trunkline 12 can be broken out at any breakout box 10 either by splicing to a loop circuit, or by cutting into the fiber circuit and leaving the remaining portion thereof dead or unconnected across the box 10.

Connections are made to the branch port connector 43 by a suitable male or female (breakout) plug 48, which can be made up having the suitable number of fibers 50 extending therefrom to optical units 52.

The breakout boxes 10 can be configured as shown in FIG. 3 during their manufacture and yet provide the versatility to allow changes to accommodate changes in the configuration of the aircraft 18. Some changes might be cutting shaped passages 54 and/or 56 (FIG. 2) through the box 10 so that optical connectors with different configurations can be used in the future without requiring disturbance of the connector 43.

Thus, there has been shown a novel optical trunkline with breakout boxes there along specifically for use on aircraft where minimal optical loss is required and, in most cases, few changes are needed during the lifetime of the aircraft so that permanent connections are desired, which fulfills all of the objects and advantages sought therefor. Many changes, alterations, modifications and other uses and applications of the subject breakout box will become apparent to those skilled in the art after considering the specification together with the accompanying drawing. All such changes, alterations and modifications which do not depart from the spirit and scope of the invention are deemed to be covered by the invention which is limited only by the claims that follow.

I claim:

1. An optical fiber breakout assembly for use in an aircraft comprising:

a circuit breakout box defining an internal cavity and having at least two optical connectors and at least one optical breakout connector;

at least multifiber two optical trunkline segments external to said circuit breakout box, each multifiber optical trunkline segment having an end portion that is in operable connection with a respective optical connector of said circuit breakout box; and a breakout cable disposed within said circuit breakout box, said breakout cable being physically separate from said at least two optical trunkline segments, said breakout cable comprising opposed end portions that each include a bundle of optical fibers and an intermediate breakout portion that includes a plurality of individually separable optical fibers, wherein the end portions of said breakout cable are operably connected to said optical connectors to thereby optically interconnect said two trunkline segments, wherein at least one of said optical fibers is separated from the remainder of said optical fibers at said intermediate breakout portion of said breakout cable such that the separated optical fiber can be operably connected to said breakout connector.

2. An apparatus according to claim 1 wherein at least one of said plurality of optical fibers of said breakout cable is severed within the intermediate breakout portion to create first and second segments, wherein each segment has a severed end, and wherein said first segment is separated from said plurality of optical fibers such that the severed end of said first segment can be operably connected to said breakout connector.

3. An apparatus according to claim 2 wherein said second segment is separated from said plurality of optical fibers, and wherein the severed end of said second segment is operably connected to said breakout connector.

4. An apparatus according to claim 2 wherein said optical fibers of said breakout cable are of sufficient length such that the first and second segments of a severed optical fiber can each be connected to said breakout connector.

5. An apparatus according to claim 1 wherein a second optical fiber is separated from the remainder of said optical fibers at said intermediate breakout portion of said breakout cable, and wherein said second separated optical fiber is terminated with a light absorbing substance.

6. An apparatus according to claim 1 wherein the opposed end portions of said breakout cable are ribbon cables, wherein and said intermediate breakout portion of said breakout cable is a loose bundle of optical fibers.

7. A method for providing optical fiber breakouts from an optical fiber trunkline of an aircraft, wherein said method includes the steps of:

providing at least two multifiber optical trunkline segments having respective end portions;

providing a circuit breakout box defining an internal cavity and having at least two optical connectors and at least one breakout connector;

placing a breakout cable within said circuit breakout box, said breakout cable having a plurality of optical fibers and comprising opposed end portions that each include a bundle of optical fibers and an intermediate breakout portion that includes a plurality of individually separable optical fibers;

separating at least one of said plurality of optical fibers of said breakout cable from the remainder of said optical fibers at said intermediate breakout portion of said breakout cable;

connecting said opposed end portions of said breakout cable to respective optical connectors of said circuit breakout box;

connecting said separated optical fiber to said breakout connector; and connecting said end portions of said multifiber optical trunkline segments to respective optical connectors of said circuit breakout box such that said multifiber optical trunkline segments are in operable optical communication with each other and such that one of said trunkline segments is in operable optical communication with the separated optical fiber that is connected to said breakout connector.

8. A method according to claim 7 further comprising the steps of:

severing at least one optical fiber of said plurality of optical fibers of said breakout cable at the intermediate breakout portion to thereby create first and second segments, wherein each of said first and second segments has a severed end;

separating said first segment from said plurality of optical fibers of said breakout cable; and connecting said severed end of said first segment to said breakout connector.

9. A method according to claim 8 wherein said separating step further comprises the step of separating said second segment from said plurality of optical fibers of said breakout cable, and wherein said connecting step further comprises the step of connecting said second segment to said breakout connector.

10. A method according to claim 8 further comprising the step of providing a breakout cable having optical fibers of sufficient length such that the first and second segments of a severed optical fiber can each be connected to said breakout connector.

11. A method according to claim 7 further comprising the step of terminating at least one of the optical fibers of said breakout cable with a light absorbing material.

12. A method according to claim 7 wherein said step of providing at least two optical trunkline segments comprises severing an optical trunkline that extends through an aircraft to thereby create two optical trunkline segments having respective severed ends.

* * * * *